United States Patent
Burrows

(10) Patent No.: US 10,657,757 B2
(45) Date of Patent: May 19, 2020

(54) HYBRID AIR MACHINE

(71) Applicant: Daniel J. Burrows, Liverpool, NY (US)

(72) Inventor: Daniel J. Burrows, Liverpool, NY (US)

(*) Notice: Subject to any disclaimer, the term of this patent is extended or adjusted under 35 U.S.C. 154(b) by 2 days.

(21) Appl. No.: 14/814,742

(22) Filed: Jul. 31, 2015

(65) Prior Publication Data

US 2017/0032608 A1 Feb. 2, 2017

(51) Int. Cl.
| | |
|---|---|
| *G07F 17/06* | (2006.01) |
| *G07F 15/00* | (2006.01) |
| *B60S 5/04* | (2006.01) |
| *G06Q 20/18* | (2012.01) |

(52) U.S. Cl.
CPC .............. *G07F 17/06* (2013.01); *B60S 5/046* (2013.01); *G06Q 20/18* (2013.01); *G07F 15/001* (2013.01)

(58) Field of Classification Search
CPC ........ G07F 17/06; G07F 15/001; B60S 5/046; B60S 5/043; G06Q 20/18
See application file for complete search history.

(56) References Cited

U.S. PATENT DOCUMENTS

| | | | |
|---|---|---|---|
| 643,264 A | 2/1900 | Clawson | |
| 1,427,450 A | 8/1922 | Ewald | |
| 1,427,529 A * | 8/1922 | Gibbs | G07F 17/06 137/355.18 |
| 1,668,753 A * | 5/1928 | Baker | G01L 17/00 137/225 |
| 1,806,983 A * | 5/1931 | Norgren | F16L 37/42 137/223 |
| 2,146,102 A * | 2/1939 | Wiegand | B60C 23/003 152/416 |
| 2,166,874 A * | 7/1939 | Monzingo | B60C 29/00 137/231 |
| 2,285,569 A * | 6/1942 | Crowley | B60S 5/043 137/229 |
| 2,525,256 A * | 10/1950 | Byram | B60C 29/062 141/38 |
| 2,791,233 A * | 5/1957 | Anderson | B60S 5/043 137/224.5 |
| 3,026,916 A * | 3/1962 | Kennedy | B60S 5/046 141/197 |
| 3,074,457 A * | 1/1963 | Tubbs | G01L 17/00 152/427 |

(Continued)

FOREIGN PATENT DOCUMENTS

WO 2006089303 A2 8/2006

*Primary Examiner* — Patrick M. Buechner
*Assistant Examiner* — Randall A Gruby
(74) *Attorney, Agent, or Firm* — Bond, Schoeneck & King, PLLC; Blaine Bettinger

(57) ABSTRACT

An inflation machine configured to inflate an item. The inflation machine includes: (i) an air pump; (ii) a first air dispenser having a first hose and a first air chuck, where the first air dispenser is an analog dispenser and is in communication with the air pump; (iii) a second air dispenser having a second hose and a second air chuck, where the second air dispenser is a digital dispenser and is in communication with the air pump; and (iv) a controller configured to activate the first air dispenser or the second air dispenser in response to a user input.

6 Claims, 2 Drawing Sheets

(56) References Cited

U.S. PATENT DOCUMENTS

| | | | | |
|---|---|---|---|---|
| 3,335,766 A * | 8/1967 | Winger | B60S 5/043 | 137/355.12 |
| 3,786,994 A * | 1/1974 | Kukes | F16K 15/20 | 239/569 |
| 3,799,218 A * | 3/1974 | Douglass | F17C 5/007 | 141/18 |
| 4,088,147 A * | 5/1978 | Krechel | F16K 15/20 | 137/223 |
| 4,236,622 A | 12/1980 | Stevenson | | |
| 4,289,225 A | 9/1981 | Scholta | | |
| 4,333,491 A * | 6/1982 | Knubley | B60S 5/046 | 137/116.3 |
| 4,474,539 A * | 10/1984 | Wolf | F04B 49/007 | 417/62 |
| 4,484,673 A | 11/1984 | Cohen | | |
| 4,510,979 A * | 4/1985 | Hjorth-Hansen | B60S 5/046 | 141/38 |
| 4,694,409 A * | 9/1987 | Lehman | B60S 5/046 | 222/52 |
| 4,763,709 A * | 8/1988 | Scholer | B60C 23/001 | 141/38 |
| 4,782,878 A * | 11/1988 | Mittal | B60C 23/003 | 137/225 |
| 4,798,233 A * | 1/1989 | Mooney | B60S 5/043 | 141/231 |
| 4,875,509 A * | 10/1989 | Da Silva | B60S 5/046 | 116/266 |
| 4,998,438 A * | 3/1991 | Martin | B60S 5/04 | 137/228 |
| 5,307,846 A * | 5/1994 | Heinemann | B60S 5/043 | 137/223 |
| 5,429,166 A * | 7/1995 | Anzai | B60S 5/046 | 141/197 |
| 5,518,021 A * | 5/1996 | Loureiro Benimeli | B60S 5/046 | 137/224 |
| 5,599,301 A * | 2/1997 | Jacobs | A61M 25/1018 | 604/65 |
| 5,611,875 A * | 3/1997 | Bachhuber | B60C 23/003 | 141/197 |
| 5,674,332 A * | 10/1997 | Battocchio | B60C 23/003 | 152/416 |
| 5,688,306 A | 11/1997 | Venni | | |
| 5,709,295 A | 1/1998 | Johnson | | |
| 5,857,417 A | 1/1999 | Hart | | |
| 5,865,340 A | 2/1999 | Alvern | | |
| 5,891,277 A * | 4/1999 | Bachhuber | B60S 5/046 | 141/197 |
| 5,967,198 A * | 10/1999 | Smalley | B60S 5/046 | 141/311 R |
| 6,044,954 A | 4/2000 | McLaughlin | | |
| 6,067,850 A * | 5/2000 | Lang | B60S 5/046 | 152/415 |
| 6,102,667 A * | 8/2000 | Johnson | B60S 5/046 | 417/12 |
| 6,155,313 A * | 12/2000 | Smalley | B60C 29/062 | 141/311 R |
| 6,170,542 B1 * | 1/2001 | Loureiro Benimeli | B60S 5/046 | 137/355.17 |
| 6,336,481 B1 * | 1/2002 | Tigges | B60C 23/003 | 141/38 |
| 6,345,650 B1 * | 2/2002 | Paasch | B29C 73/166 | 141/100 |
| 6,412,524 B1 * | 7/2002 | Fogal, Sr. | B60C 29/062 | 141/100 |
| 6,441,732 B1 * | 8/2002 | Laitsaari | B60C 23/0401 | 340/438 |
| 6,655,925 B1 * | 12/2003 | Robenalt | F04B 35/06 | 137/557 |
| 6,705,360 B1 * | 3/2004 | Bonzer | B60S 5/046 | 141/192 |
| 6,783,028 B1 | 8/2004 | Ambrose et al. | | |
| 6,789,581 B2 * | 9/2004 | Cowan | B29C 73/166 | 141/100 |
| 7,040,153 B2 * | 5/2006 | Kroll | G01L 17/00 | 73/146 |
| 7,137,417 B2 * | 11/2006 | Kroll | B60S 5/046 | 141/38 |
| 7,188,154 B2 * | 3/2007 | Minowa | G06Q 30/0238 | 705/14.38 |
| D544,895 S * | 6/2007 | Izumoto | D15/199 | |
| 7,258,140 B2 * | 8/2007 | Acree | B60P 7/0846 | 137/210 |
| 7,270,225 B1 | 9/2007 | Chang | | |
| 7,555,903 B2 * | 7/2009 | Tarasinski | B60C 23/003 | 152/415 |
| 7,556,478 B2 * | 7/2009 | Klein | F04B 35/04 | 137/116.3 |
| 7,770,608 B2 * | 8/2010 | Lighter | B60S 5/046 | 137/266 |
| 7,789,112 B1 * | 9/2010 | Wise | B60S 5/046 | 141/1 |
| 7,975,731 B2 | 7/2011 | Shultz et al. | | |
| D653,131 S * | 1/2012 | Petrucelli | D10/64 | |
| 8,091,590 B2 | 1/2012 | Graham | | |
| 8,191,586 B2 * | 6/2012 | Huval | 141/38 | |
| 8,196,616 B2 * | 6/2012 | Lighter | B60S 5/046 | 141/231 |
| 8,443,852 B2 | 5/2013 | McCaughey | | |
| D683,768 S * | 6/2013 | McCaughey | D15/9 | |
| 8,474,491 B2 * | 7/2013 | Lachman | B60S 5/046 | 141/105 |
| 8,746,293 B2 * | 6/2014 | Chou | B60S 5/04 | 141/38 |
| 8,794,258 B2 * | 8/2014 | Galasso | F17C 6/00 | 137/223 |
| 8,887,769 B1 * | 11/2014 | Ohm | F04B 35/04 | 141/38 |
| 9,115,636 B2 * | 8/2015 | Allen | F01P 11/0204 | |
| 9,353,739 B2 * | 5/2016 | Wilson | F04B 41/06 | |
| 9,457,772 B2 * | 10/2016 | Paasch | B60S 5/04 | |
| 9,649,898 B2 * | 5/2017 | Scott | B60C 29/06 | |
| 2003/0180156 A1 * | 9/2003 | Brashears | F04B 35/06 | 417/234 |
| 2004/0003865 A1 * | 1/2004 | Skoff | B60C 23/003 | 141/38 |
| 2006/0180256 A1 * | 8/2006 | Mittal | B60C 23/003 | 152/416 |
| 2006/0272732 A1 * | 12/2006 | Lighter | B60S 5/046 | 141/38 |
| 2007/0186636 A1 * | 8/2007 | Wise | B60S 5/046 | 73/146 |
| 2007/0237652 A1 * | 10/2007 | Belanger | B60C 23/04 | 417/279 |
| 2008/0098855 A1 * | 5/2008 | Cegelski | B29C 73/166 | 81/15.6 |
| 2008/0266073 A1 * | 10/2008 | Tu | B60C 23/0406 | 340/442 |
| 2009/0260710 A1 * | 10/2009 | Huval | B60S 5/046 | 141/38 |
| 2010/0154922 A1 * | 6/2010 | Turiello | A62B 13/00 | 141/2 |
| 2010/0258587 A1 * | 10/2010 | Wheeler | B60S 1/50 | 222/2 |
| 2010/0290929 A1 * | 11/2010 | Ohi | F04B 35/06 | 417/360 |
| 2011/0073214 A1 * | 3/2011 | Guan | B29C 73/166 | 141/38 |
| 2011/0172821 A1 * | 7/2011 | Carter | B60S 5/046 | 700/259 |
| 2011/0182754 A1 * | 7/2011 | Gathers | F02B 63/04 | 417/234 |
| 2011/0247723 A1 * | 10/2011 | Lachman | B60S 5/046 | 141/4 |
| 2012/0007730 A1 | 1/2012 | Vecht-Lifshitz et al. | | |
| 2012/0283984 A1 * | 11/2012 | Peng | B60S 5/046 | 702/138 |

(56) References Cited

U.S. PATENT DOCUMENTS

| | | | |
|---|---|---|---|
| 2012/0285581 A1* | 11/2012 | McCaughey | B60S 5/046 |
| | | | 141/38 |
| 2012/0285794 A1 | 11/2012 | Upton et al. | |
| 2013/0177452 A1* | 7/2013 | Wilson | F04B 41/06 |
| | | | 417/62 |
| 2014/0271257 A1* | 9/2014 | Nelson | F04B 25/00 |
| | | | 417/53 |
| 2014/0305538 A1* | 10/2014 | Story | B60S 5/043 |
| | | | 141/1 |
| 2015/0059918 A1* | 3/2015 | Schondorf | B60S 5/046 |
| | | | 141/4 |
| 2016/0144672 A1* | 5/2016 | Wang | F04B 35/04 |
| | | | 141/38 |
| 2017/0015147 A1* | 1/2017 | McClellan | B60C 23/12 |
| 2017/0061723 A1* | 3/2017 | Upton | G07F 5/02 |
| 2017/0190322 A1* | 7/2017 | Fish | F04B 35/06 |

* cited by examiner

HYBRID AIR MACHINE

FIELD OF THE INVENTION

The present disclosure is directed generally to a hybrid air pump machine with both a chuck-style dispenser and a digital tire inflator.

BACKGROUND

Air pumps have been available to consumers at gas stations, repair shops, and other locations for decades. These air pumps, which are either pay or free, are utilized by the customer to fill tires of automobiles, trailers, bicycles, and other types of vehicles. Only recently have digital tire inflators been available to consumers. These inflators can be more precise than traditional air pumps, and have several options include automatically stopping when a set pressure is reached. However, consumers often have to search for digital tire inflators, and do not have the option of choosing between a chuck-style dispenser and a digital tire inflator at the same machine.

Further, coupons have been used to entice consumers to shop at a store based on prior purchases. For example, many registers now dispense coupons to consumers at the time of check-out, which are based on the consumer's current purchase or past purchases.

Accordingly, there is a continued need in the art for a hybrid air pump machine that offers both a chuck-style dispenser and a digital tire inflator at the same machine. There is also a continued need in the art for a means to entice a consumer who may intend to only stop for air to enter the store or facility where the air machine is located.

SUMMARY OF THE INVENTION

The present disclosure is directed to an inventive hybrid air pump machine. Various embodiments and implementations herein are directed to a hybrid air pump machine offering both a chuck-style dispenser and a digital tire inflator at the same machine. The hybrid machine can include a coupon dispenser that with each use dispenses a coupon. The coupon can be specific to the store, establishment, or facility associated with the air machine. Alternatively, the coupon can be specific to a product or sponsor that is sold in or by the store, establishment, or facility associated with the air machine.

For example, in some embodiments, the inventive hybrid air pump machine comprises a chuck-style dispenser and a digital tire inflator. The user can then decide which type of dispenser to use, a decision that might be dictated by the vehicle. The hybrid air pump machine may be entirely free, may require payment for either dispenser, or may charge for only one of the two dispensers. After use, the hybrid air machine may dispense a coupon to the user to encourage them to enter the store to make a purchase.

In one aspect, an inflation machine configured to inflate an item is provided. The inflation machine includes: (i) an air pump; (ii) a first air dispenser having a first hose and a first air chuck, where the first air dispenser is an analog dispenser and is in communication with the air pump; (iii) a second air dispenser having a second hose and a second air chuck, where the second air dispenser is a digital dispenser and is in communication with the air pump; and (iv) a controller configured to activate the first air dispenser or the second air dispenser in response to a user input.

According to an embodiment, the inflation machine includes a coupon mechanism. According to an embodiment, the coupon mechanism is configured to dispense a coupon when the inflation machine is used by a user. According to an embodiment, the coupon can be configured for the establishment where the inflation machine is located. According to an embodiment, the coupon can be configured for a product sold where the inflation machine is located.

According to an embodiment, the inflation machine includes a payment mechanism. According to an embodiment, the payment mechanism comprises a revenue sharing mechanism.

According to an embodiment, the inflation machine includes a user interface. According to an embodiment, a user selects a desired air pressure using the user interface.

According to an embodiment, the air pump is configured to pump nitrogen gas.

According to an embodiment, the inflation machine includes a pressure sensor.

According to an embodiment, the inflation machine includes a vacuum.

According to an embodiment, the inflation machine includes a communications system.

According to an aspect an inflation machine configured to inflate an item is provided. The inflation machine includes: (i) an air pump; (ii) a pressure sensor; (iii) a first air dispenser having a first hose and a first air chuck, where the first air dispenser is an analog dispenser and is in communication with the air pump; (iv) a second air dispenser having a second hose and a second air chuck, where the second air dispenser is a digital dispenser and is in communication with the air pump; (v) a controller configured to activate the first air dispenser or the second air dispenser in response to a user input; and (vi) a coupon mechanism configured to dispense a coupon when the inflation machine is used by a user.

According to an aspect an inflation machine configured to inflate an item is provided. The inflation machine includes: (i) an air pump; (ii) a payment mechanism; (iii) a pressure sensor; (iii) a first air dispenser having a first hose and a first air chuck, where the first air dispenser is an analog dispenser and is in communication with the air pump; (iv) a second air dispenser having a second hose and a second air chuck, where the second air dispenser is a digital dispenser and is in communication with the air pump; (v) a user interface, where a user selects a desired air pressure using the user interface; (vi) a controller configured to activate the first air dispenser or the second air dispenser in response to a signal from the payment mechanism; and (vii) a coupon mechanism configured to dispense a coupon when the inflation machine is used by a user; where the controller inactivates the activated air dispenser in response to a signal from the pressure sensor that the desired air pressure is achieved.

These and other aspects of the invention will become clear in the detailed description set forth below.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a system and method for providing a hybrid air pump machine comprising a chuck-style dispenser and a digital tire inflator. According to an embodiment, the hybrid air machine is configured to dispense air or nitrogen gas. The user may decide between using air versus using nitrogen, or the hybrid air machine may make that decision for the user based on various factors. For example, the air machine may determine that the nitrogen supply is depleted or otherwise unavailable, and may only offer air.

Figure 1:
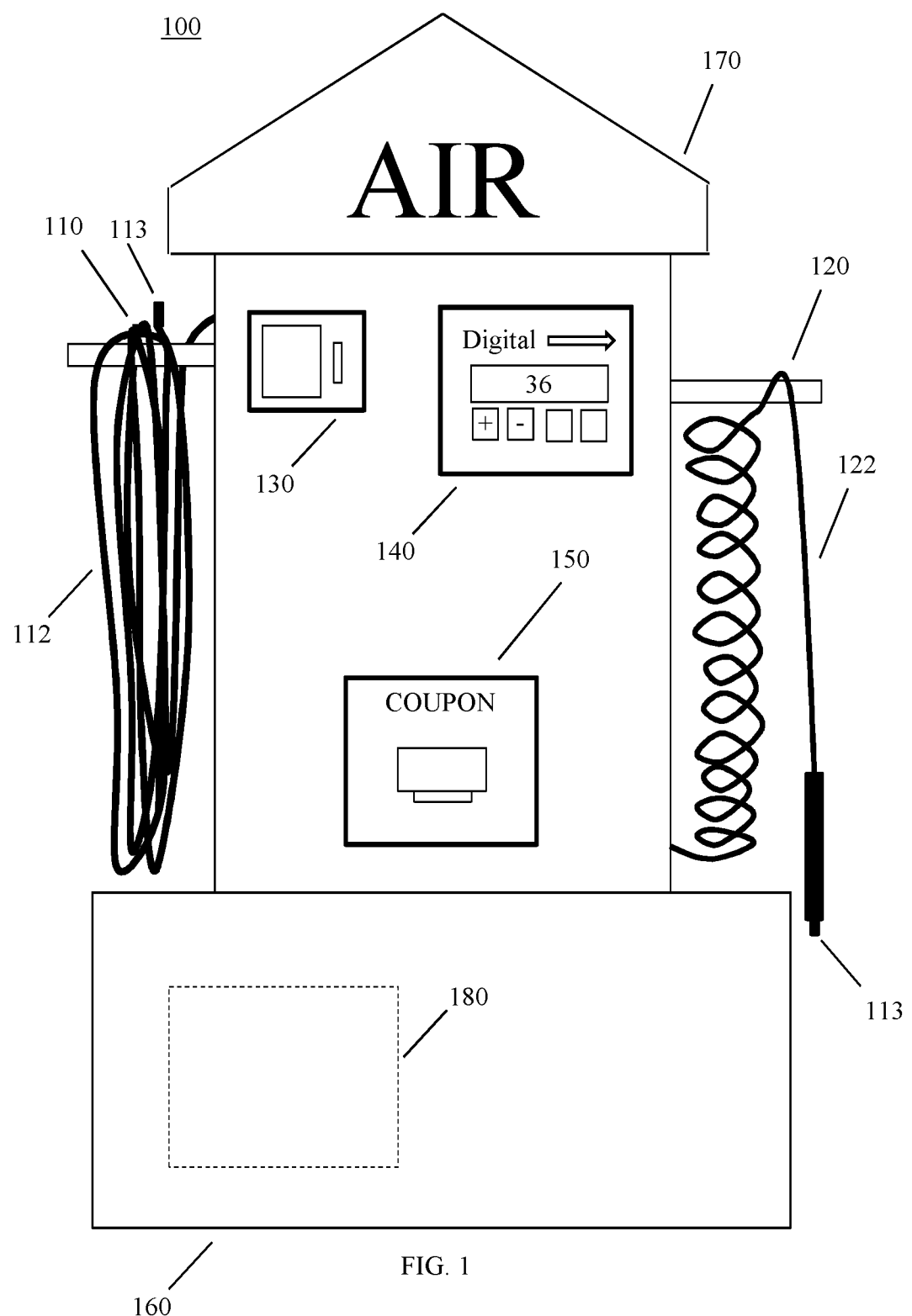
FIG. 1 is a schematic representation of a hybrid air machine with coupon dispenser in accordance with an embodiment.

Referring to FIG. 1, in one embodiment, is a hybrid air machine 100. According to an embodiment, the hybrid air machine 100 comprises a chuck-style air dispenser 110, and a digital air dispenser 120, which is electronically-controlled. The air machine can have many shapes, sizes, and styles, and can optionally comprise a lower, base portion 160 and an upper or upright portion 170. As yet another example, hybrid air machine 100 can be a single structural component in any shape, such as a square, and/or could be built into another structural unit such as a wall or floor. The chuck-style air dispenser 110 has a hose 112 and the digital air dispenser 120 has a hose 122, which delivers air from the pump mechanism. At the end of each hose 112 and 122 is a chuck 113, which is designed and configured to deliver air to an inflatable device. The chuck 113 can be of various sizes, and can be adaptable. The inflatable device can be a tire for any vehicle or moveable object, balloons, toys, or any of a wide variety of devices.

According to an embodiment, hybrid air machine 100 can include a payment mechanism 130. For example, the hybrid air machine can accept and/or require payment to dispense air or gas through the chuck-style dispenser and/or through the digital dispenser. Payment may only be required for one type of dispenser, or for a coupon to be dispensed. Accordingly, the hybrid air machine may comprise one or more payment mechanisms 130 to accept payment, including but not limited to a coin mechanism, bill mechanism, and/or debit/credit mechanism, among others. The customer can, for example, insert a predetermined number of coins such as quarters into a coin mechanism, of which there can be one or more. A beep or other indication might be heard or seen when the coin is deposited and accepted. The money can slide down a chute or otherwise enter a coin safe, for example. The hybrid air machine can include a credit or debit card mechanism, connected by WiFi, land line, and/or cellular line, to accept credit or debit card payment. According to an embodiment, the hybrid air machine can include or be in direct communication with a concrete or steel base. This base or any other part of the machine may optionally include, for example, one or more of the coin or money safes or boxes 180 described or otherwise envisioned herein.

According to an embodiment the hybrid air machine includes a revenue sharing mechanism such that the owner of the hybrid air machine and the owner of the location where the machine is located can split the proceeds of the machine. For example, the hybrid air machine may include two money safes or boxes, one for the owner of the machine and one for the owner of the location, such that revenue is split between the two safes or boxes. Sharing may be equal or at a certain unequal percentage. The owner may have access to one of the safes or boxes in order to periodically withdraw funds. Alternatively, in the case of credit or debit card payments, the revenue may be shared with the owner of the location electronically by depositing funds into the owner's account immediately or at certain amounts or time frames. The revenue may also be shared by periodically sending a check or other payment to the owner.

According to an embodiment, hybrid air machine 100 can include a user interface 140. The user interface, which may be used for the chuck-style air dispenser 110, the digital air dispenser 120, or both dispensers. The user interface can display information such as payment required, payment received, payment remaining, time remaining, desired pressure, tested pressure, and a variety of other outputs. Further, the user interface can be designed to receive input from the user, including but not limited to desired pressure. According to an embodiment there can be a counter with a window to view from outside, and the counter can track the number of coins deposited. There may also be a counter that counts down the amount of time remaining, or the amount of money needed to activate the mechanism or extend the remaining time.

According to an embodiment the hybrid air machine also includes a coupon or ticket mechanism or dispenser 150. Coupon or ticket mechanism 150 can be permanently or removably attached to the hybrid air machine, or can be located inside the machine with an opening to dispense the ticket(s) or coupon(s). For example, when the unit is activated, the ticket dispenser can dispense a coupon or ticket for a product sold at the location where the unit is located, or for a generic product, or just a discount for the store, establishment, or facility where the unit is located. The ticket/coupon dispenser can operate automatically or by pressing a button. According to one embodiment, the ticket/coupon/token can be used immediately or at a future date to operate the hybrid air machine or some other machine. The coupon or ticket can be printed on regular paper or thermal paper, among a wide variety of other substrates. It may be a redemption-style coupon or ticket.

Figure 2:
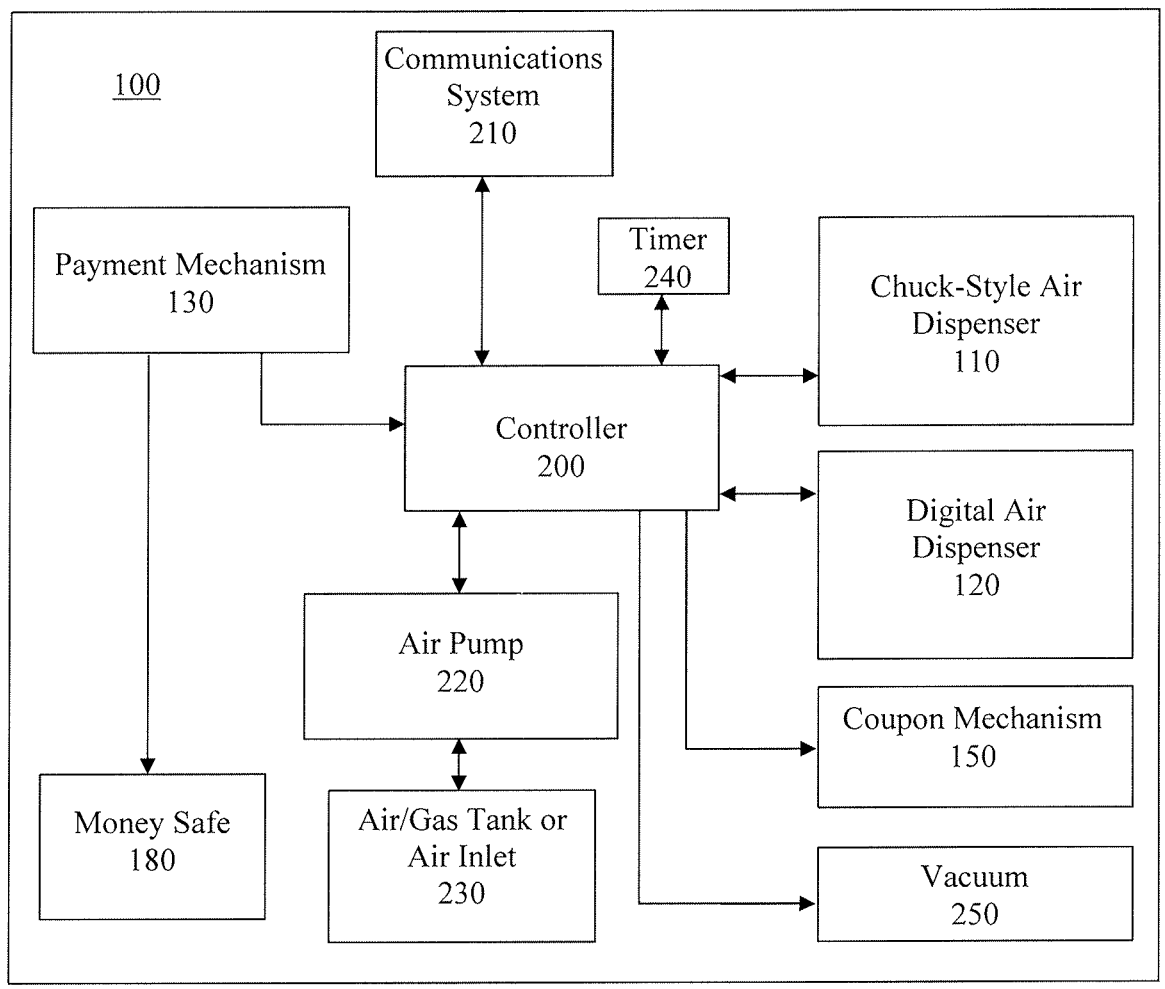
FIG. 2 is a schematic representation of a hybrid air machine in accordance with an embodiment.

Referring to FIG. 2, in one embodiment, is a hybrid air machine 100. According to an embodiment, the hybrid air machine 100 comprises a controller 200 that controls the functionality of the machine. The controller can be, for example, any processor capable of receiving input and creating a signal directing the machine to dispense air. When the user provides the correct amount of money—either through coins, bills, and/or credit/debit card payment, the money mechanism generates a signal indicating that payment in full has been received and sends that signal to the controller. Alternatively, if no payment is necessary, a signal is created in response to a user action such as pushing a button or switch, triggering a movement sensor, or using some other activation device.

The controller can then activate the air pump 220 to dispense air. The controller may optionally request or wait for input from the user regarding whether the chuck-style or digital dispenser is used, whether air or nitrogen is dispensed, or any of a variety of other options. According to one embodiment these options are decided prior to payment.

With the requisite amount of information, the machine can send an electronic signal to dispense gas. The controller may send a signal, for example, to a timer 240 that begins to track time. The timer can be a module or component of the controller 200, or can be a separate component or element in communication with the controller. For example, after the timer 240 receives the correct number of signals from the controller and/or the payment mechanism, the controller or timer allows power to be supplied to the unit and the compressor turns on. For example, the digital unit may become operational when the timer sends a signal to a relay switch, which tells the digital unit to allow the digital dispenser to operate. There is optionally always power to the digital unit, but pressure may not be adjustable until the relay sends power as described above. The digital unit will inflate or deflate the tire to the pressure that the user has chosen once the timer is activated. According to an embodiment the traditional air hose and chuck-style dispenser can be used as well as digital once the timer is activated. Once the timer is activated and the unit turns on, it can supply gas until the predetermined amount of time expires, and/or until the user deactivates the machine, among other options.

According to an embodiment the user can read tire pressure without having to activate the machine or deposit coins or other payment. Tire pressure can also be checked without timer activation as well with the traditional air hose. For example, pressure could be checked by attaching end of air hose and gauge to the valve stem and reading the pressure on the gauge and/or user interface.

Air can be supplied by any compressor capable of providing air at the predetermined range of pressures. There can be, for example, a filter over the intake port of the compressor in order to prevent debris from entering the compressor. According to another embodiment the compressor is in communication with a nitrogen tank 230 for supplying nitrogen gas to the tires. As just one example, there can be two exhaust ports on the compressor. One of the exhaust ports can, for example, have a pressure relief valve attached which is set to let air escape once pressure builds up to 90 PSI, or some other maximum PSI value. On the other exhaust port, for example, there can be a male/female brass fitting, such as a one-quarter inch, 90 degree brass fitting, with an unloader value attached to the elbow. The unloader valve, for example, can protect against a dangerous amount of backpressure and can relieve pressure when the compressor turns off According to an embodiment, a one-quarter inch pipe nipple can be attached to the unloader valve, and a one-quarter inch female brass fitting can be attached to the brass nipple. A one-quarter inch hose with one-quarter inch hose barbs can be attached to each end of the hose. The hose can then be attached to the fitting on the compressor and the other end brought down to a three-way one-quarter inch brass fitting. A one-quarter inch steel pipe nipple can be attached to the three-way fitting and placed through a hole on the bottom where a one-quarter inch 90 degree brass female fitting with a three-quarter inch washer is attached from the outside. According to an embodiment the traditional air hose can be connected here.

The remaining opening on the three-way valve can have a one-quarter inch hose attached with one-quarter inch barbs attached to each end. This hose, for example, can run to the intake on the digital unit. The output from the digital unit can have a one-quarter inch hose with a one-quarter inch hose barb attached to each end, and the other end can be connected to a 90 degree male/female fitting. The male side can be connected to a one-quarter inch brass female fitting. From the outside, another 90 degree brass male/female fitting and three-quarter inch washer can be connected, and this can be where the hose for the digital unit is connected.

Although specific sizes and materials for the various components are provided above as an example, the invention is not limited to these sizes and this example does not limit the invention. Many other sizes, materials, and configurations are possible. For example, the size of the hose used to fill tires or for inside the machine can range from ¼ to ⅝, among many other sizes.

According to an embodiment a manual valve or electronic solenoid valve can be used to divert air to the digital or non-digital portion of the machine. For example, the user can push a button to switch between the gas sources or between the dispensers. Alternatively, the user may physically switch between the gas sources or between the dispensers by moving a lever or other component that in turn moves a valve inside the machine.

According to an embodiment there can be various lights, such as LED lights, buzzers, digital or analog output, or other notification means. According to one example, there are five LED lights attached to the hybrid air machine. These lights can be connected to a transformer that is in turn connected to constant power on the control panel. One light, such as a green light or a red light, can indicate to the user that the unit has power and is able to operate.

According to an embodiment the hybrid air machine also includes a vacuum 250 that can be attached to the unit and work from the control panel inside the air machine. The vacuum can be free or paid, and money can be provided using any of the mechanisms described above. The hybrid air machine may dispense tickets, tokens, or coupons after use of the vacuum just as with any other component of the machine. For example, the hybrid air machine may dispense coupons for cleaning products after use of the vacuum, although any type of product or coupon can be dispensed. For example, the machine may dispense only one type of coupon regardless of how the device is used, or the machine may dispense may different coupons that are chosen based on one or more inputs, where the inputs can be date, time, weather, use of the machine, and/or any of a variety of other options.

According to an embodiment the hybrid air machine also includes a communications system 210, which can be used for communication, remote monitoring, diagnosis, and other functionality. For example, the machine may periodically report to a central location by WiFi, landline, cellular connection, or any of a variety of connections. Periodic reports might be hourly, daily, or weekly, among other time periods. Reports may include money collected, number of times used, number of tickets or coupons dispensed, number of coupons redeemed, or any of a variety of other reports. A central location may then use that information to monitor the health of the machine. For example, a report that the machine averages a certain number of runs a day but suddenly one day has no runs may indicate a problem with the machine, such as an inability to accept payment or dispense air. The reports may also include more direct information about the health of the machine, including but not limited to any errors or other issues with the machine. For example, a report may indicate that paper is low in the coupon dispenser, that a coin is jammed in the coin box, that the nitrogen supply is exhausted, or any of a wide variety of other notifications or errors. A complete lack of a report may indicate that power has been lost or that there is a bigger error or issue with the machine.

According to an embodiment the control panel of the hybrid air machine can include, but is not limited to, a timer, an outlet such that there can be power even if the unit lacks power, a switch to power to the unit on and off for purposes of working on the unit, an eight terminal block for wiring, and/or a relay for the digital unit. Many other components of the control panel are possible to provide the functionality described or otherwise envisioned herein.

According to an embodiment there can be freeze protection for the hybrid air machine, particularly in regions where the machine will experience freezing temperature. For example, freeze protection can be supplied by an inline unit placed before the three-way bale. The cup of the inline unit can be filled with a chemical such as propylene glycol, among many other chemicals, which is then pushed into the hose in very small quantities to prevent water in the hose from freezing. As another example, the device may include a heater that provides constant heat to the machine when temperatures fall below a certain level. Many other ways of preventing freezing are possible.

According to an embodiment the hybrid air machine can include a mechanism for the machine to be activated remotely, such as from inside the store, establishment, or facility where the machine is located. For example, a user may find that the device cannot accept money or that the machine didn't start when it received payment in full, or that the device shut down too early. Other reasons exist for why the remote activation might be necessary. For example, the establishment owner might have a switch or activation button inside the store that allows them to remotely activate the machine. The remote activation might occur through wiring that leads from the store to the machine, or it might operate via a WiFi, landline, cellular, or other connection.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. An inflation machine configured to inflate an item, the inflation machine comprising:
   an air pump;
   a pressure sensor;
     a first air dispenser comprising a first hose and a first air chuck, wherein a user manually controls an amount of air dispensed, wherein a flow of air is stopped manually, and wherein the first air dispenser is in communication with the air pump;
     a second air dispenser comprising a second hose and a second air chuck, wherein the second air dispenser is an electronically-controlled dispenser in which a flow of air is stopped without manual control, and wherein the second air dispenser is in communication with the air pump;
     a user interface, wherein a user selects a desired air pressure using the user interface;
     a controller configured to activate the first air dispenser or the second air dispenser in response to a user input from the user interface;
     a coupon dispenser configured to dispense a coupon when the inflation machine is used by a user, wherein the coupon is configured for an establishment where the inflation machine is located; and
     a payment mechanism configured to receive a payment in exchange for operation of the first acid: or second air dispenser;
   wherein the controller is configured to inactivate the electronically-controlled dispenser in response to a signal from the pressure sensor that the desired air pressure is achieved.

2. The inflation machine of claim 1, wherein the coupon is configured for a product sold where the inflation machine is located.

3. The inflation machine of claim 1, wherein the payment mechanism comprises a revenue sharing mechanism.

4. The inflation machine of claim 1, wherein the air pump is configured to pump nitrogen gas.

5. The inflation machine of claim 1, further comprising a vacuum.

6. The inflation machine of claim 1, further comprising a communications system.

* * * * *